United States Patent Office 3,535,148
Patented Oct. 20, 1970

3,535,148
PROCESS FOR PREPARING POLYMERIZED AMINOPLAST SURFACE COATINGS USING IONIZING RADIATION
Abraham Ravve, Lincolnwood, Ill., assignor to Continental Can Company, Inc., New York, N.Y., a corporation of New York
No Drawing. Filed Aug. 7, 1968, Ser. No. 750,749
Int. Cl. C08f 1/18; C08g 9/20, 9/32
U.S. Cl. 117—93.31
9 Claims

ABSTRACT OF THE DISCLOSURE

A process for coating an article wherein there is applied to the surface of the article to be coated a thin film of a polymerizable etherified aminoplast prepared by the reaction of a monohydric alcohol with a condensate of an ethylenically unsaturated amide, a polyfunctional amine and an aldehyde, such as formaldehyde, and exposing the film-containing surface to a source of ionizing radiation for a time sufficient to effect polymerization of the aminoplast film.

BACKGROUND OF INVENTION

Field of invention

This invention is related to the coating of substrates, such as metal, paper, plastic and the like, and more particularly, to organic coatings prepared by polymerizing unsaturated polymeric materials on an article substrate surface using ionizing radiation.

The prior art

In the manufacture of containers from metal sheet, a protective organic coating is applied to the side of the metal sheet which is to form the interior of the container. The materials which are employed for coating the metal are generally heat-curable resinous materials which are applied in the form of a solution of dispersion in a volatile organic solvent. The wet-coated metal surface is passed through an oven in which hot air is circulated to evaporate the solvent and to cure the coating material to the required hardness. As this form of coating application is relatively slow, the art is continually seeking more rapid methods of increasing the speed of coating application.

Among the various methods which have been proposed to increase the speeds at which metal sheet can be coated is to apply a layer of suitable thickness of an unsaturated monomer or mixture of monomers to the metal sheet surface whereupon the monomer layer is activated to interact and form a cured polymer coating by exposing the layer to a source of ionizing radiation. The activation action is carried out at ambient temperatures and, since the action of the ionizing radiation is extremely rapid, the monomer layer can be polymerized in a continuous flow movement across the source of irradiation. Since no evaporation of solvent is required, desirable polymeric coatings are obtained in relatively short periods of time.

Although a wide variety of unsaturated monomeric compounds have been proposed for use in forming polymeric coatings using ionizing radiation curing procedures, these compounds, when exposed to a source of ionizing irradiation do not always form hard, adherent, flexible solvent-resistant coatings of the type which are required for interior can coatings.

SUMMARY OF THE INVENTION

In accordance with the present invention, there is provided a rapid method of preparing hard, solvent-resistant adherent polymeric coatings on article substrates and particularly metal substrates, wherein there is applied to the substrate a thin film of a liquid polymerizable etherified aminoplast resin, the aminoplast resin being comprised of the condensation product of an ethylenically unsaturated amide, a polyfunctional amine selected from aminotriazine or urea and an aldehyde such as formaldehyde. The etherified aminoplast-coated side of the substrate is then exposed to a source of ionizing radiation for a time sufficient to effect the polymerization of the etherified aminoplast and to convert the etherified aminoplast into a continuous, strongly-adherent and flexible coating on the substrate.

The process of the present invention eliminates the high cost and time of the oven-baking cycle which is currently used for producing metal surface coatings. The polymerized coating prepared by the process of the present invention contains no residual catalysts or other foreign substances enabling the coating to readily meet the purity standards required of coatings in the container field.

PREFERRED EMBODIMENTS

The ethylenically unsaturated amides used to prepare the polymerizable prepolymer used in the process of the present invention are ethylenically unsaturated amides having the general formula:

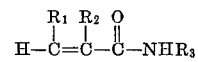

wherein $R_1$ may be hydrogen or alkyl, $R_2$ may be hydrogen, alkyl, aryl, or aralkyl, and $R_3$ is one of the group consisting of H, —$NH_2$, —$(CH_2)_n$—OH, —$(CH_2)_n$—$NH_2$ $(CH_2)$—$CONH_2$, —$C_6H_4CONH_2$, —$C_6H_4CH_2CONH_2$, and —cyclohexyl—$CONH_2$ wherein $n$ is an integer greater than one.

Exemplary of these amides are acrylamide, methacrylamide, ethacrylamide, α-phenylacrylamide, crotonamide, 2-pentanoic acid amide, sorbic acid amide, etc., unsaturated hydrazines, such as acrylhydrazides, methacrylhydrazides, etc., and unsaturated substituted amides wherein the radical attached to the nitrogen atom contains an active hydrogen atom, as, for example, N-ethanol methacrylamide, N-aminoethyl acrylamide, N-(B-carbamylethyl) acrylamide, N-(p-carbamylphenyl)-acrylamide, N-(p-carbamylmethylphentl) - acrylamide, N-4 (4-carbamylcyclohexyl acrylamide, etc.

Illustrative examples of polyfunctional amines which may be used to prepare the polymerizable etherified aminoplasts of the present invention include urea and aminotriazines, such as melamine, and N-substituted melamines wherein from 1 to 3 of the amino hydrogen atoms are replaced with alkyl, cycloalkyl, aryl or acyl groups containing from 1 to 6 carbon atoms, and guanamine compounds corresponding to the general formula:

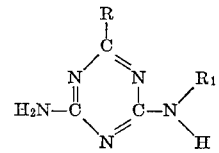

wherein R is either hydrogen or a hydrocarbon radical containing from 1 to 7 carbon atoms, and $R_1$ is either hydrogen or an alkyl, aryl or acyl group containing from 1 to 6 carbon atoms. Illustrative examples of such aminotriazines include melamine, 2,4-diamino-6-methylamino-s-triazine, 2,4-diamino-6-dimethylamino-s-triazine, 2,4-diamino-6-phenylamino-s-triazine, 2,4 - diamino-6-acrylamino-s-triazine, 2,4 - diamino-6-butylamino-s-triazine, 2-amino - 4,6 - di(cyclohexylamino)-s-triazine, 2-amino-4,6-dimethylamino)-s-triazine, 2-amino - 4 - methylamino-6-dimethylamino-s-triazine, 2,4,6-tri(methylamino)-s-triazine, 2,4,6-tri(cyclohexylamino) - s - triazine, 2-amino-4-butylamino - 6 - methylamino-s-triazine, guanamine, N-methyl guanamine, N-butyl-guanamine, N-phenyl guanamine, N-actyl guanamine, benzoguanamine, N-methyl benzoguanamine, N-acetyl benzoguanamine, phenylaceto guanamine, N-methyl phenylaceto guanamine, and N-acetyl acetoguanamine, etc.

The polymerizable etherified aminoplast resins are prepared by admixing the ethylenically unsaturated amide, polyfunctional amine and formaldehyde at a molar ratio in the range of 1:1:3 to 3:1:6 with or without acrylamide condensation catalysts, such as hydroquinone-2,5-disulfonic acid, toluene sulfonic acid, acetic acid, and then heating at 80° to 100° C. until a clear solution is obtained. If a condensation catalyst is employed, it is removed from the reaction mixture. The etherified aminoplast resin is obtained by adding a monohydric aliphatic alcohol to the reaction mixture in a substantial excess of that required to react with the aminoplast reaction product. The monohydric alcohols which may be employed are monohydric aliphatic alcohols having 1 to 6 carbon atoms, such as methyl, ethyl, butyl, hexyl, and the like. The alcohol functions as both a reactant and as a solvent for the reaction. Preferably, the reaction is carried out under reflux conditions (at either atmospheric or reduced pressure) so that water may be removed from the reaction system by azeotropic distillation. The monohydric alcohol and the aminoplast reaction product are heated with or without condensation catalysts within a temperature range of about 110° to 120° C. The reaction is continued so long as water of reaction is evolved. After the completion of this reaction, the excess monohydric alcohol and catalyst are removed using conventional separation and vacuum distillation techniques. The monohydric alcohol etherified amide/polyfunctional amine/formaldehyde reaction product is generally a colorless, viscous liquid having a viscosity in the range of 200 to 300 centistokes per second (c.p.s.). The liquid product is immiscible in water and readily wets steel plate.

To effect the polymerization of the etherified aminoplast, a film of the aminoplast is irradiated with a source of ionizing radiation such as ultraviolet light or a beam of high energy electrons.

The source of ultraviolet light is suitably emitted from an artificial source having a wavelength in the range between 4000 A. and 1800 A., the irradiation source being of an intensity of at least 100 watts/in. An exposure time to the ultraviolet source of about 1 to 3 seconds is required to effect polymerization of etherified aminoplast.

Low pressure mercury vapor discharge tubes in quartz are the preferred source of ultraviolet light. Low pressure mercury vapor discharge tubes in glass and high-pressure mercury vapor discharge tubes in quartz or glass may be employed if desired.

Irradiation with ultraviolet light of a wavelength below 2600 A. is preferred. When the polymerizable, etherified aminoplast film is irradiated with ultraviolet of wavelength below 2600 A., the intensity of the irradiation should be between about 100 to about 1800 watts/in. for an exposure time of about 1 to 3 seconds. Generally, the source of irradiation is positioned ¼ to 1½ inches from the polymerizable film surface.

As regards any particular conditions of source and distance, the duration of the irradiation treatment can be determined by a few trials.

High energy electrons used to effect the polymerization of the etherified aminoplast are obtainable from beams of high energy electrons produced by high voltage electron accelerators. There are several well-known types of electron accelerators available for this purpose. For example, the Van de Graaff electrostatic accelerator, resonant transformers, transformer- rectifiers, impulse of capacitrons, microwave waveguide linear accelerators, betratrons, and synchrotrons. The Van de Graaff type generator and the transformer-rectifiers produce electron beams in continuous streams, while the other generators mentioned produce the beams in pulses. The electrons in the beams produced by any of these generators ordinarily possess energy exceeding 100,000 electron volts.

The dosage of the irradiation produced by these electron beams is measured in terms of the quantity of energy absorbed by the material irradiated. The "rad" is the unit of absorbed dose. In radiation dosimetry, a megarad is defined as a dose of irradiation producing an energy absorption of 100 million ergs per gram of absorbent material irradiated.

In order to effect polymerization of the polymerizable etherified aminoplast by irradiation with high energy electrons in accordance with the process of the present invention, a dosage level within the range of about 0.1 megarad to about 10.0 megarads has been found to be satisfactory. The particular dosage level required in each case is dependent upon the thickness and the density of the particular polymerizable aminoplast being irradiated.

The electron beam polymerization of the polymerizable etherified aminoplast is inhibited by the presence of air, and therefore, it is preferred to exclude air from the reaction zone and perform the irradiation in a vacuum or in an inert atmosphere such as nitrogen.

In coating metal substrates in accordance with the process of the present invention, the polymerizable etherified aminoplast is applied to a substrate in liquid form in any convenient manner as by spraying, dipping, roll coating, and the like. As the polymerizable etherified aminoplast may not always be of a viscosity suitable for application by the above methods, it can be heated to reduce viscosity. Also, polymerizable ethylenically unsaturated monomers which are compatible and form homogeneous mixtures with the polymerizable etherified aminoplast may be blended with the product. Suitable compatible polymerizable monomer diluents include styrene, vinyl toluene, glycol diacrylate, vinyl esters, such as vinyl acetate, vinyl propionate, and higher homologues thereof.

In coating metal surfaces in accordance with the process of the present invention, a thin film of the polymerizable etherified aminoplast is applied on the metal substrate generally in the form of a sheet which is positioned to travel on a conveyor and pass under a source of ionizing radiation.

In addition to polymerizable monomers, the polymerizable etherified aminoplast for use in this invention may also contain fillers, pigments, dyes and the like, provided that these materials do not affect or prevent the polymerization of the etherified aminoplast contained in these mixtures.

The preferred coating weight for coating metal sheet substrates with an adequately protective organic coating suitable for use in container manufacture is in the range of 1.5 to 15.0 milligrams of polymerized coating per square inch of substrate surface. To obtain these coating weights, the liquid solution of polymerizable etherified aminoplast is applied at a coating thickness of about 0.15 to about 1.0 mil, which thickness is adequate to permit penetration by the ionizing radiation to effect the polymerization.

The present invention is illustrated, but not limited, by the following examples.

*Example I.*—A polymerizable etherified aminoplast was prepared by the following procedure:

To a 1 liter, round-bottom flask, equipped with an air condenser, was charged the following reactants:

| Reactant: | Grams |
|---|---|
| Acylamide | 65 |
| Melamine | 37.8 |
| Formaldehyde | [1]190 |
| Triethylamine [2] | 2 |

[1] 40% solution formaldehyde in n-butanol.
[2] Catalyst.

The temperature of the reaction mixture was raised to 95° to 100° C. and the mixture heated for 45 minutes until a clear solution was obtained. The reaction mixture was cooled to about 60° and a vacuum (25 to 27 in Hg) was applied for 5 minutes to remove the triethylamine.

One hundred milliliters of n-butanol and 0.3 gram of hydroquinone—2,5-disulfonic acid was added to the reaction mixture. The mixture was heated to achieve reflux and water was removed by azeotropic distillation with n-butanol. Twenty-five milliliters of water were collected before the evolution of water stopped. The reaction mixture was cooled, the catalyst removed with an anionic ion exchange resin, and the unreacted alcohol removed by vacuum distillation. The reaction product was a colorless liquid having a viscosity of about 200 c.p.s.

To a 5 x 3 inch steel plate was applied a 0.0005 inch thick film of the polymerizable butylated acrylamide/melamine/formaldehyde reaction product prepared above. The coated plate was placed on a continuously moving conveyor whose speed could be adjusted so as to control the time of the irradiation under a stationary, high-intensity mercury vapor, ultraviolet quartz lamp emitting ultraviolet light at peak wavelength of 2537 A. and an intensity of 100 watts/in. The conveyor was adjusted so that the coated plate traveled 0.75 inch under the surface of the ultraviolet bulb for an exposure time of about 1 second. The polymerized coating was hard, clear, colorless and adherent to the steel plate and was uneffected by contact with methyl ethyl ketone.

*Example II.*—The procedure of Example I was repeated with the exception that the coated plate was irradiated in a nitrogen atmosphere with an electron beam at 300 million electron volts to a dosage of 2 megarads. The irradiated liquid film was found to be a polymerized, hard, clear, flexible, strongly-adherent coating, resistant to the action of water and methyl ethyl ketone.

When benzoguanamine or urea is substituted for melamine in the etherified aminoplast, the polymerized coating has properties similar to that of the etherified acrylamide/melamine/formaldehyde condensate.

By way of contrast, when an etherified acrylamide/formaldehyde condensate was used as a film material and exposed to 2 rads, the resultant coating covered the steel surface unevenly and could be lifted off the metal by water soaking.

By way of further contrast, when an acrylamide/melamine/formaldehyde condensate was used as a film material and exposed to 2 rads, the resultant coating was brittle and poorly adherent to the metal substrate.

*Example III.*—The procedure of Example II was repeated with the exception that a film composition consisting of a blend of 70 parts of the butylated acrylamide/melamine/formaldehyde resin and 30 parts vinyl toluene were irradiated with an electron beam at 300 million electron volts at a dosage of 2 megarads. The polymerized film was hard, clear, flexible, strongly-adherent to the metal plate, and resistant to the action of water.

What is claimed is:

1. A process for coating an article comprising the steps of—
    applying to the surface of the article to be coated a thin film of a polymerizable etherified aminoplast prepared by the reaction of a monohydric aliphatic alcohol having 1 to 6 carbon atoms with the condensation product prepared from the reaction of—
    (a) an ethylenically unsaturated amide having the general formula

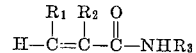

wherein $R_1$ is selected from the group consisting of hydrogen and alkyl, $R_2$ is selected from the group consisting of hydrogen, alkyl, aryl, and aralkyl, and $R_3$ is one of the group consisting of H, $-NH_2$, $-(CH_2)_n-OH$, $-(CH_2)_n-NH_2$, $-(CH_2)_n-CONH_2$, $-C_6H_4CONH_2$, $-C_6H_4-CH_2CONH_2$, and —cyclohexyl—$CONH_2$, and $n$ is an integer greater than one;
    (b) a polyfunctional amine selected from the group consisting of aminotriazines and urea; and
    (c) formaldehyde;
    exposing the film containing surface to a source of ionizing radiation for a time sufficient to effect polymerization of the aminoplast film to obtain the coated article.

2. The process of claim 1 wherein the film is polymerized with a source of ultraviolet light.

3. The process of claim 1 wherein the film is polymerized with a beam of high energy electrons.

4. The process of claim 1 wherein the film thickness of the film ranges from 0.15 to 1.0 mil.

5. The process of claim 1 wherein the monohydric alcohol is butanol.

6. The process of claim 1 wherein the ethylenically unsaturated amide is acrylamide.

7. The process of claim 1 wherein the polyfunctional amine is melamine.

8. The process of claim 1 wherein the polymerizable etherified aminoplast is blended with a compatible ethylenically unsaturated monomer and irradiated.

9. The process of claim 1 wherein the ethylenically unsaturated monomer is vinyl toluene.

References Cited

UNITED STATES PATENTS 2,866,770 12/1958 deJong _____ 260—70X
3,050,495 8/1962 Christenson.

ALFRED L. LEVITT, Examiner

J. H. NEWSOME, Assistant Examiner

U.S. Cl. X.R.

117—132, 161; 260—67.6, 70, 71, 849, 851, 856; 204—159.21